US007211906B2

(12) United States Patent
Teets et al.

(10) Patent No.: US 7,211,906 B2
(45) Date of Patent: May 1, 2007

(54) RANKINE—MICROTURBINE FOR GENERATING ELECTRICITY

(75) Inventors: Joseph Michael Teets, Hobe Sound, FL (US); Jon William Teets, Scottsdale, AZ (US)

(73) Assignee: TMA Power, LLC, Hobe Sound, FL (US)

( * ) Notice: Subject to any disclaimer, the term of this patent is extended or adjusted under 35 U.S.C. 154(b) by 45 days.

(21) Appl. No.: 11/393,204

(22) Filed: Mar. 30, 2006

(65) Prior Publication Data
US 2006/0220388 A1   Oct. 5, 2006

Related U.S. Application Data

(60) Provisional application No. 60/668,127, filed on Apr. 4, 2005.

(51) Int. Cl.
*F02C 60/20* (2006.01)
(52) U.S. Cl. .................... 290/52; 290/1 A; 60/655; 60/39
(58) Field of Classification Search ............... 290/1 A, 290/52; 60/39.182, 434, 655
See application file for complete search history.

(56) References Cited

U.S. PATENT DOCUMENTS 3,971,211 A * 7/1976 Wethe et al. ............ 60/39.181
3,974,642 A * 8/1976 Pacault .................... 60/39.182
4,677,829 A * 7/1987 Archer et al. ................ 60/780
4,841,721 A * 6/1989 Patton et al. ................ 60/775
5,086,234 A * 2/1992 Shiota et al. ................ 290/52
5,174,107 A * 12/1992 Ogawa et al. ............. 60/39.12
5,632,148 A * 5/1997 Bronicki et al. ............. 60/728
6,050,083 A * 4/2000 Meckler .................. 60/39.182

* cited by examiner

*Primary Examiner*—Darren Schuberg
*Assistant Examiner*—Iraj A. Mohandesi

(57) ABSTRACT

An electrical output power generation system is provided. A gas turbine engine rotor spool with at least one alternator rotor and steam turbine rotor are integrated and within a engine body having a combustor or external heat source having fluid communication with the bladed compressor rotor and a gas turbine bladed rotor of the said rotor spool. The alternator rotor has permanent magnets retained and positioned in close proximity and co-axial to the electrical stator having iron laminat and electrical wires. Relative rotational motion between the electrical stator and alternator rotor cause magnetic flux and subsequent electricity to be generated. The steam energy to drive the said rotor spool integrated steam turbine rotor can be from the gas turbine engine exhaust waste heat and or thru external heat energy sources.

7 Claims, 3 Drawing Sheets

RANKINE—MICROTURBINE FOR GENERATING ELECTRICITY

This application claims benefit of the provisional application Ser. No. 60/668,127 filed Apr. 4, 2005.

BACKGROUND OF THE INVENTION

1. Field of the Invention

This invention relates generally to gas turbine electrical power generation and more specifically to a rankine-microturbine as a combined cycle turbine system having a common rotor shaft, incorporating a steam turbine with a gas turbine rotor spool with an integral alternator rotor in close proximity and co-axially within a laminated iron stator with wires to generate electricity.

2. Description of Prior Art

It can be appreciated that microturbines, a non-synchronous electrical power generator, have been in use for years. Typically, microturbines are comprised of gas turbines such as in U.S. Pat. Nos. 6,314,717, 6,605,928, 5,497,615 and Japanese patent 061737714 and currently demonstrate <30% cycle efficiency incorporating heat exchangers, <15% cycle efficiency without heat exchangers and the hybrid-microturbine of application Ser. No. 10/809,719 having <23% cycle efficiency incorporates a staged compressor for improved cycle efficiency without a heat exchanger. All the above can be incorporated into Combined Heat and Power (CHP) system to attain higher thermal efficiency. Synchronous electrical power generation typical of current electrical power-plants include the simple turbojet, a single spool type gas turbine with electrical output power efficiency approaching 43%, a combined cycle turbine system having a gas turbine driving a generator and separate steam turbine extracting heat energy from the gas turbine exhaust to drive another generator and combining the electrical output power to yield efficiency near 60%. More recently, large combined cycle turbines have been introduced as in GE patent 6897577 where the gas turbine and steam turbine are clutch coupled to drive a common generator and expected to yield >60% electrical output power efficiency. Other gas turbine companies offering a similar clutch coupled synchronous driven common generator idea include Siemens (Diesel & Gas Turbine World of Feb. 2006 article) and Westinghouse (ASME PWR2004-52072 proceeding). Microturbines (non synchronous generators), typically less than 500 Kw offer some advantages either in line tie or island system especially in a CHP cycle but still lack high electrical output power efficiencies for opportunities in main power applications. Combined cycle electrical power systems have synchronous power generators and are large power-plants and have either separate generators for the steam and gas turbines or more recently use a clutch coupled steam turbine and gas turbine to drive a common generator yielding >60% electrical output power efficiency; but are too complex and expensive for smaller power-plant applications. Complexity will lend to higher power plant maintenance cost even thou the fuel cost is the biggest factor in the $/Kw-hr billing. Another issue with conventional microturbines is the use of heat exchanger to attain ~30 efficiency is still too low for distributed continuous main power applications and with the heat exchanger there are limitations on start-up and shut-down cycles concerning turbine exhaust gas temperature as high as 1300F and material costs life cycle considerations.

A hybridmicroturbine with its staged higher compressor ratio (~23% at maximum power) has higher efficiency at off design than that of the microturbine with heat exchanger and does not have start up or shut down limitation like this microturbine; but due to the lower efficiency, has limited main grid power uses. The microturbine and hybrid microturbine with low emissions, multifuel capability and minimal maintenance will greatly replace the reciprocating generator sets (gensets) with $/Kw initial purchase cost being competitive; the latter is most evident in the hybrid microturbine along with portability offering low weight (no exhaust gas heat exchanger).

While these devices may be suitable for the particular purpose to which they address, they are not as suitable for providing a combined cycle turbine system with a common shaft between the steam turbine and the gas turbine integral alternator rotor as a one spool rotor system to yield high electrical power cycle efficiency, simplicity, reduced installation cost and maintenance. This smaller main power-plant would lend itself to stand alone communities, business, and industrial applications or simply more available to distributed energy without major disruptive events either man made or weather related. Low emissions is a major feature and lower fuel use means lower CO2. In these respects, the Rankine-Microturbine according to the present invention substantially departs from the conventional concepts and design of the prior art, and in so doing provides an apparatus primarily developed for the purpose of providing a combined cycle turbine system with a common shaft between the steam turbine and the gas turbine integral alternator rotor as a one spool rotor system to yield high output electrical power efficiency, simplicity, reduced installation cost and low fuel use.

SUMMARY OF THE INVENTION

In view of the foregoing disadvantages inherent in the known type of microturbines now present in the prior art, the present invention provides a new combined cycle system, the Rankine-Microturbine incorporating a microturbine wherein the same can be utilized for providing a combined cycle turbine system having a common shaft between the steam turbine and the gas turbine integral alternator rotor, a one spool rotor system, to yield high electrical output power efficiency, simplicity, reduced installation cost and reduced emissions specie CO2 thru reduced fuel usage.

The general purpose of the present invention, which will be described subsequently in greater detail, is to provide a new combined cycle electrical power generator the Rankine-Microturbine that has many of the advantages of the microturbines mentioned heretofore and many novel features that result in a new combined cycle electrical power generation system which is not anticipated, rendered obvious, suggested, or even emplied by any of the prior art microturbines or combined cycle system either alone or in any combination thereof.

To attain this, the present invention generally comprises a microturbine or a hybrid-microturbine, a steam turbine seal, a steam turbine seal support, a steam turbine housing, a steam turbine nozzle, a steam turbine rotor, a steam turbine shroad, and steam housing cap. The microturbine has one turbine rotor-compressor rotor-alternator rotor assembly spool with retained rotor magnets that are positioned coaxially within an electrical stator for electric output power. A Hybrid-Microturbine is a Microturbine without an exhaust gas heat exchanger, and incorporates a turbocharger to extract energy from the microturbine exhaust gases for a multistage high pressure engine compressor. The Steam Turbine Seal is a static device that pre vents exhaust steam from entering the rotor spool bearing cavity and minimizes the steam leakage past the steam turbine rotor shaft. The Steam Turbine Seal Support is a static structure that retains the steam turbine shaft seal, ducts steam turbine shaft leakage overboard and transitions buffer air to the steam turbine shaft seal. The Steam Turbine Housing is a static structure that receives high energy steam, directs steam to the turbines nozzle, retains the steam turbine with shrouds and ducts steam turbine exhaust from the hsg. The Steam Turbine Nozzle accepts steam from the steam housing and directs high energy steam with an imparting velocity to the steam turbine channeled/bladed rim for developed shaft power. The Steam Turbine Rotor converts high velocity steam internal energy into mechanical kinetic energy shaft power thru disk rim blades that redirect steam velocity causing shaft rotational work. The Steam Turbine Shroud is a static device that conforms to the rotating blade tip contour with minimum clearance acing as a seal to allow maximum steam pressure within the blade channels. The Steam Housing Cap is a static detail that allows for the steam turbine assembly/disassembly, steam turbine shroud and steam turbine nozzle installation and is steam exhaust cavity cover.

There has thus been outlined, rather broadly, the more important features of the invention in order that the detailed description thereof may be better understood, and in order that the present contribution to the art may be better appreciated. There are additional features of the Rankine-Microturbine invention that will be describe hereinafter.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a rankine-microturbine combined cycle system that will overcome the shortcomings of the prior art devices. An object of the present invention is to provide a rankine-microturbine combined cycle system with a common shaft between the steam turbine and the gas turbine integral alternator rotor as a one spool rotor system to yield high cycle efficiency and simplicity with reduced installation cost.

Another object is to provide a rankine-microturbine that yields a high electrical power cycle efficiency in a combined cycle turbine electrical power generator in the microturbine class having one common generator/alternator driven by the gas turbine and stream turbine.

Another object is to provide a ranking-microturbine that offers more durability, less maintenance, less operating cost and greater cycle efficiency than any piston type internal combustion engine electrical power generator.

Another object is to provide a rankine-microturbine that offers on site stand alone low cost electric power for home owners, industry and business as main power, emergency or standby applications.

Another object is to provide a rankine-microturbine that allows for a combined cycle turbine for lower electric power applications in either line tie or stand alone application. Another object is to provide a rankine-microturbine that allows combined turbine electrical power generation using microturbine and or hybrid microturbne technology for distributed power and or on site power generation.

Other objects and advantages of the present invention will become obvious to the reader and it is intended that there objects and advantages are with the scope of the present invention.

To the accomplishment of the above and related objects, this invention may be embodied in the form illustrated in the accompanying drawing, attention being called to the fact, however, that the drawing are illustrative only, and that changes may be made in the specific construction illustrated.

BRIEF DESCRIPTION OF THE DRAWINGS

Various other objects, features and attendant advantages of the present invention will become fully appricieated as the same becomes better understood when considered in conjunction with the accompanying drawings, in which like reerence characters designate the same or similar parts throughout the several views, and wherein.

DESCRIPTION OF THE PREFERRED EMBODIMENT

Figure 1:
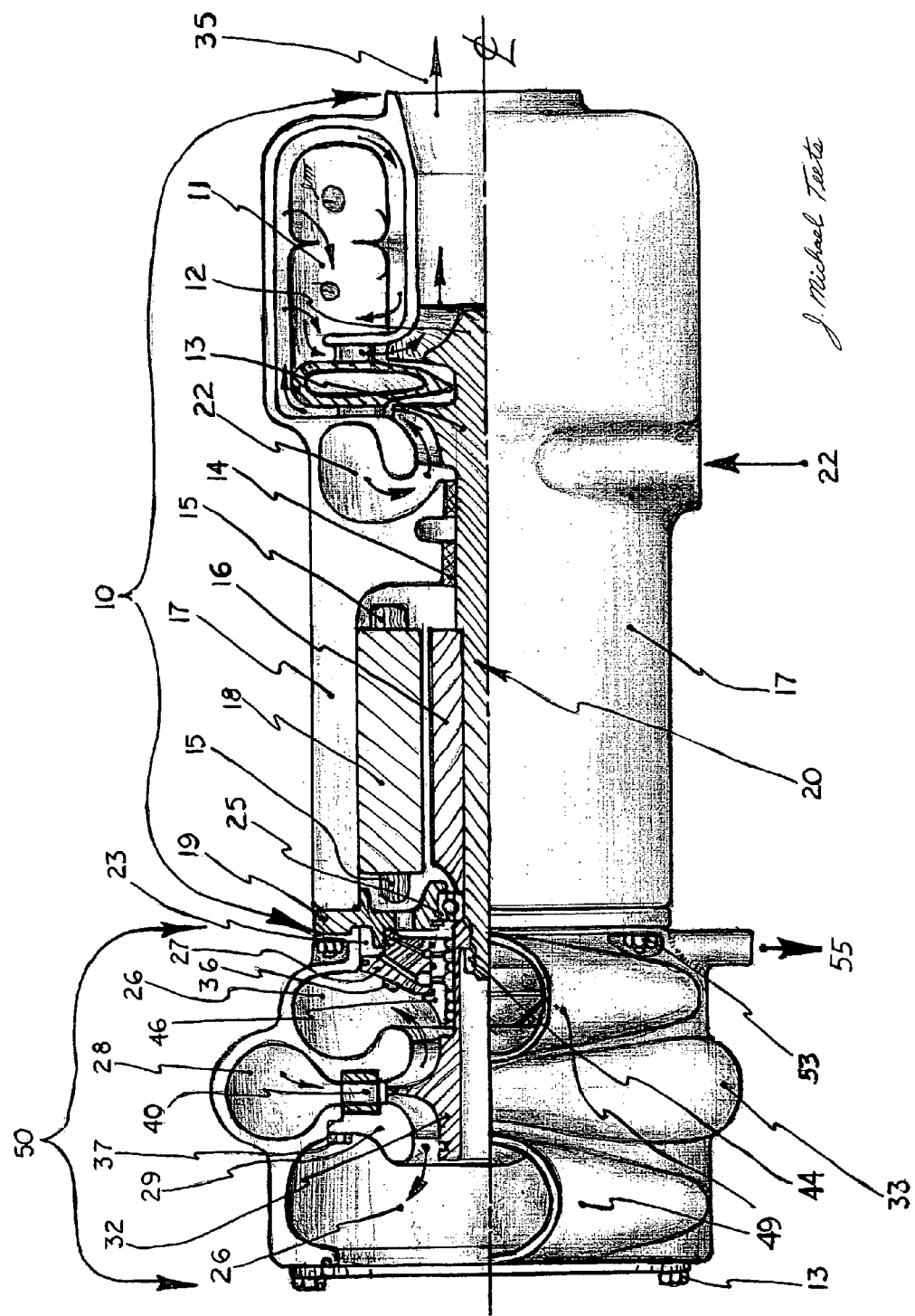
FIG. 1 is a ¼ cross-section side view of the Rankine-Microturbine assembly.
Figure 2:
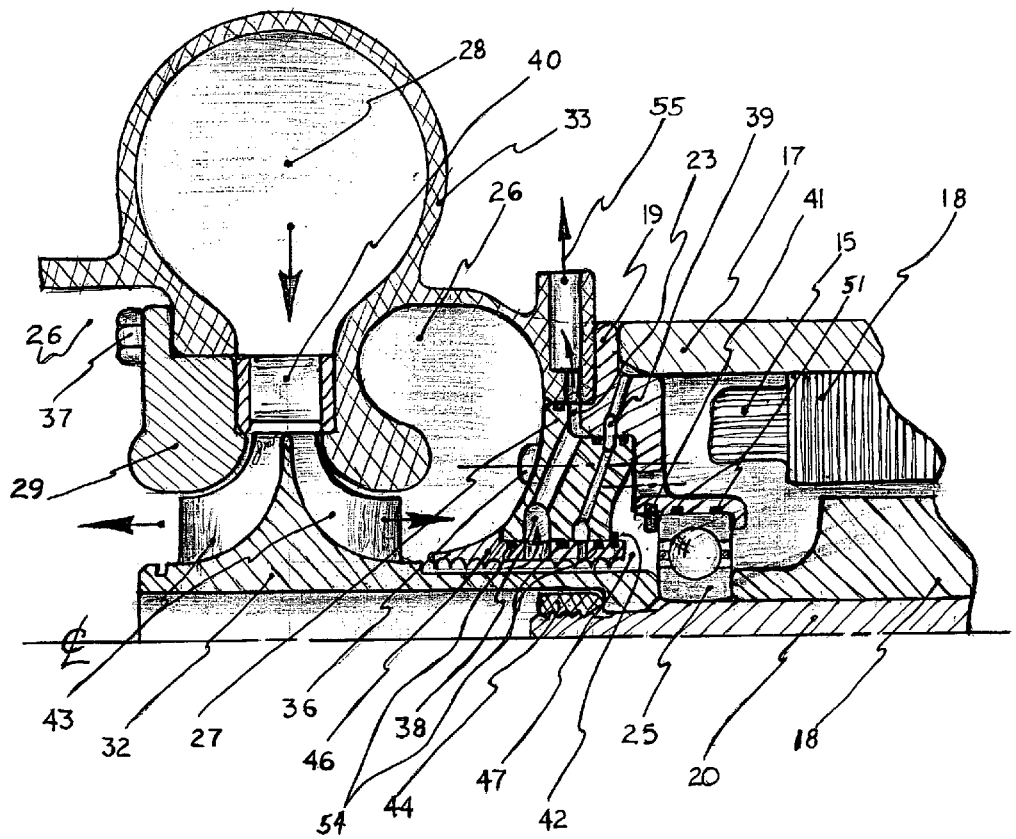
FIG. 2 is a ¼ cross-section side view of the Rankine cycle turbine module.
Figure 3:
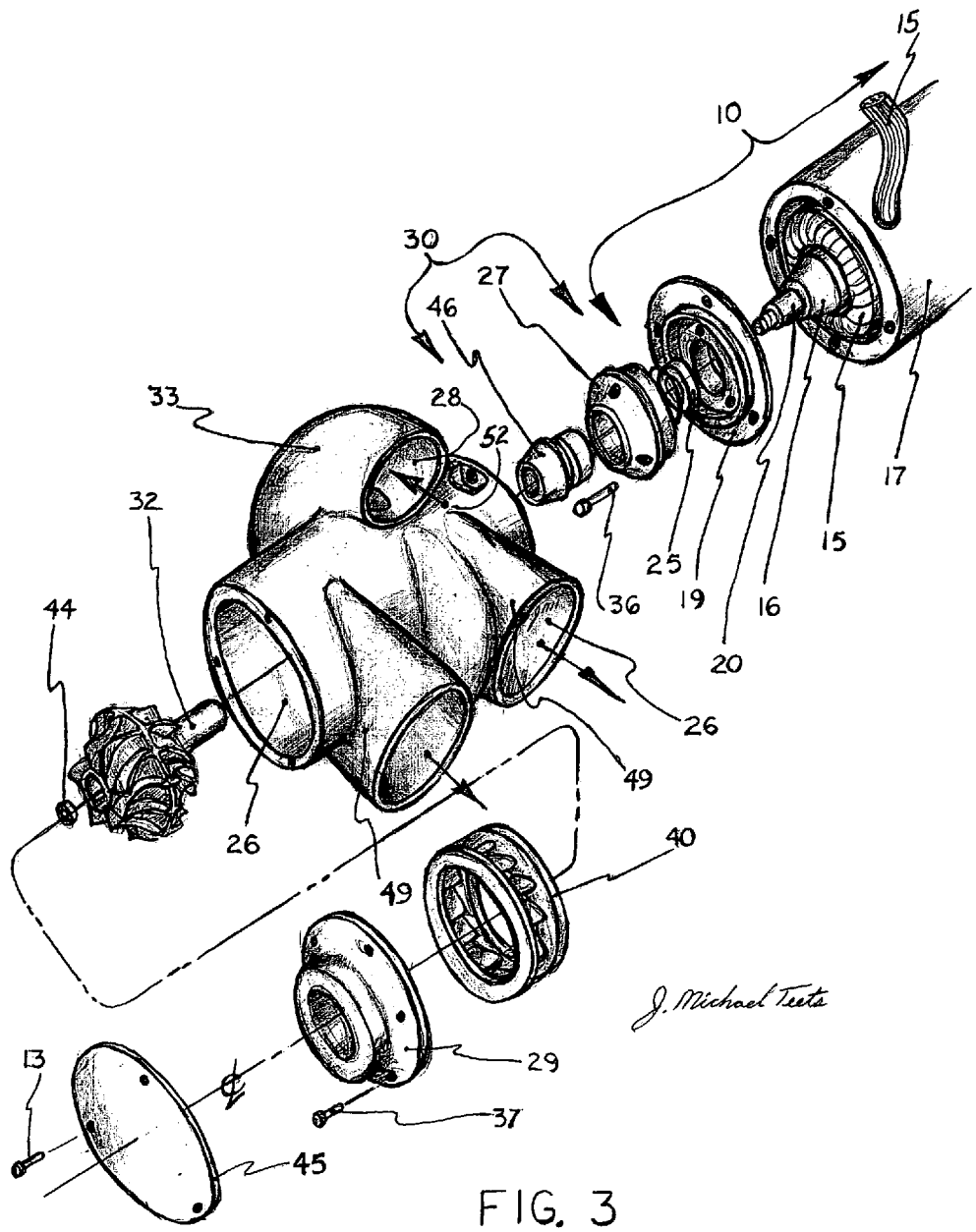
FIG. 3 is a orthogonal exploded assembly view of the Rankine cycle turbine module.

Turning now descriptively to the drawings, in which similar reference characters denote similar elements throughout the several views, the attached figures illustrate a Rankine-Microturbine system, which comprises a Microturbine or Hybrid-Microturbine, a Steam Turbine Seal, a Steam Turbine Seal Support, a Steam Turbine Housing, a Steam Turbine Nozzle, a Steam Turbine Rotor, a Steam Turbine Shroud, and Steam Housing Cap. The Microturbine has one gas turbine rotor—compressor rotor—alternator rotor assembly spool with retained rotor magnet that are positioned coaxially within an electrical stator for electric power. A Hybrid-Microturbine is a microturbine without a turbine exhaust heat exchanger and incorporates a turbocharger to extract energy from the microturbine exhaust for a multistage high pressure engine compressor. The Steam Turbine Seal is a static device that prevents exhaust steam from entering the rotor spool bearing cavity and minimizes the steam leakage past the steam turbine rotor shaft. The Steam Turbine Seal Support is a static structure that retains the steam turbine shaft seal, ducts steam turbine shaft leakage overboard and transitions buffer air to the steam turbine shaft seal. The Steam Turbine Housing is a static structure that receives high energy steam, directs steam to the steam turbine nozzle, retains the steam turbine and shrouds and ducts steam turbine exhaust from the hsg. The Steam Turbine Nozzle accepts steam from the steam housing and directs high energy steam with an imparting velocity to the steam turbine channeled/bladed disk rim for developed shaft power. The Steam Turbine Rotor converts high velocity steam internal energy into mechanical kinetic energy shaft power thru disk rim blades that redirect steam velocity causing shaft rotation work. The Steam Turbine Shroud is a static device that conforms to the rotating blade tip contour with minimum clearance acting as a seal to allow maximum steam pressure within the blade/channels. The Steam Housing Cap is a static detail that allows for the stream turbine assembly/disassembly, steam turbine shroad and steam turbine nozzle installation and is a steam exhaust cavity cover.

The Microturbine has one gas turbine rotor-compressor—alternator rotor assembly spool with retained rotor magnets that are positioned coaxially within an electrical stator for electric power and is an electrical power output generating device with rotor spool. The single rotor spool integrates a compressor rotor, gas turbine rotor and alternator rotor as one rotating element. The alternator rotor has secured high strengths magnets and as an assembly is coaxially positioned in close proximity to an electrical stator having iron base laminates with wires where rotational rotor magnet assembly within the stator creates high voltage output and frequency. To make use of the high voltage and frequency, an AC to DC bridge rectified is incorporated (for DC output) as an external power electronic system. For AC power output additional electronics are added. Rotor bearing are incorporated with the rotor spool to allow rotation. An internal combustor is used to create heat energy from an external fuel source and is mixed with air from the compressor for a combustible mixture. The ignited fuel/air mixture heat energy drives the rotor spool thru a gas turbine nozzle directing the hot gases with velocity onto the bladed turbine rotor developing rotational energy to drive the compressor and alternator rotor the latter of which generates the electrical output power.

The Microturbine is a Brayton Cycle and in operation draws air into the engine from the atmosphere thru the rotor spool rotation of the bladed compressor driven by battery energy to the alternator rotor during the start-up mode or simply using an air impingement arrangement onto the compressor or turbine blade rotors. At a self sustaining rotor speed where the combustor heat energy drives the gas turbine rotor spool without start assist the rotor will be accelerated to the power/design speed with subsequent electrical output. Cooling of the electrical stator can be thru liquid or gas means. The rotor bearing, depending on the application can be air type, magnetic or oil lubricated type the latter of which allows for a common simple system and high output power density relative to the electrical stator size and also accept high mobil vehicle g loads applications.

A Hybrid-Microturbine is a microturbine without a gas turbine exhaust heat exchanger, and incorporates a turbocharger that extracts energy from the microturbine exhaust waist gas heat for a multistage high pressure engine compressor. A microturbine type engine having two rotor spools for a staged compressor system; incorporates the use of a turbocharger utilizing the microturbine exhaust to drive the turbo charger spool for compressed air supply to the microturbine compressor inlet. The increased compressor pressure ratio increases cycle efficiency thru less turbine power to drive the power rotor compressor and more available power to drive the alternator. The turbocharger replaces the typical gas turbine exhaust heat exchanger allowing less generator set weight and no main rotor exhaust gas heat exchanger durability issues.

The Steam Turbine Seal is a static device that prevents exhaust steam from entering the rotor spool bearing cavity and minimizes the steam leakage past the steam turbine rotor shaft. The steam rotor seal is a static structural device and for simplicity as an embodiment, incorporates a labyrinth design to isolate the steam turbine exhaust from the rotor bearing cavity. Exhaust steam leakage thru the lab seal is channeled out of the steam housing seal support to the steam trap collection area for recycle; at the same time buffer air is supplied to the area of the rotor shaft lab. Seal to keep the oil in the bearing cavity and steam out. The buffer air will mix with the steam shaft seal leakage and pass to the steam trap and to the atmosphere. There are other versions of shaft seals such as a carbon face seal that could yield no steam or oil leakage but are costly and absorb shaft horsepower.

The Steam Turbine Seal Support is a static structure that retains the steam turbine shaft seal, ducts turbine shaft steam leakage overboard and transitions buffer air to the steam turbine shaft seal.

The Steam Turbine Housing is a static structure that receives high energy steam, directs steam to the turbine nozzle, retains the steam turbine with shrouds and ducts steam turbine exhaust from the housing.

The Steam Turbine Nozzle within the steam turbine housing, directs the high energy developed from the gas turbine prime mover exhaust gas waist heat or from an external heat source, with an imparting velocity to the steam turbine channeled/bladed rim for developed shaft power.

The Steam Turbine Rotor converts high velocity steam internal energy into mechanical kinetic energy shaft rotation work. The preferred embodiment radial inflow turbine rotor having a back to back integrally bladed rotor with high load and neutral axial thrust capabilities, requires a simple one end removable with the static blade tip shroud for assembly/disassembly considerations. The steam turbine rotor is a rotational device having blades attached or integrated channels to the periphery; it provides an energy conversion from internal energy of high pressure steam into the mechanical energy thru directional vane flow into work on a shaft where channels or connected blades change the direction or motion of the steam from the steam turbine nozzle/vaned jets causing shaft rotation. The back to back radial turbine design was selected to minimize any thrust balance change into the microturbine rotor spool with the integration of this steam turbine rotor. The steam turbine rotor is cantilevered mounted off the main engine rotor spool to supply additional rotational energy to the common gas turbine alternator rotor spool to yield increased electrical power output efficiency with simplicity. Other possible steam turbines could be configured and date back to 1837 by Avery at Syracues-New York and DeLaval of Stockholm. Conventional turbines have classification of impulse, reaction or combination. The impulse type include DeLaval, Simple Curtis, re-entry, Tateau and Muyltistage Curtis. Reaction types include axial flow, Parsons and Ljungstrom. The Combination class include Curtis-Rateau and Curtis-Parsons.

The Steam Turbine Shroud is a static device that conforms to the rotating blade tip contour with minimum clearance acting as a seal to allow maximum steam pressure within the blade channels for power extraction.

The Steam Housing Cap is a static detail that allows for the steam turbine assembly/disassembly, steam turbine shroud and steam turbine nozzle installation and is a steam exhaust cavity cover. The cap allows axial insertion assembly of the steam turbine rotor attachment to the microturbine engine rotor and also the radial turbine one end steam turbine shroud. The cap keeps the exhaust steam from the atmosphere and could be integrated into a two piece steam turbine housing having an axial split line.

This Rankine-Microturbine electrical power generator invention incorporates a steam turbine rotor 32 with a microturbine or hybrid microturbine rotor spool 20 to drive a common integrated alternator rotor 16 having a gas turbine rotor 12, compressor rotor 13, to yield high electrical and thermal cycle efficiencies. A microturbine engine 10 having an integral alternator rotor 16, compressor 13 and gas turbine rotor 12 as a one spool rotor 20 has one end of the rotor spool with bearing 25 and retention means 44. This open ended shaft can be configured to receive the cantilevered steam turbine rotor 32. The microturbine engine body 10 with an internal combustor 11, a static alternator stator 18 with output electrical wires 15, compressor inlet air cavity 22 and having an alternator rotor 16-compressor rotor 13-gas turbine rotor 12 as a spool 20 is mounted to steam turbine housing 33 with retention bolts 18. The steam turbine shaft seal 46 with the seal support 27 is retained to the bearing support 19 with bolts 36 and is located between the rotor bearing 25 and steam turbine 32 to prevent a turbine exhaust steam leakage from entering the bearing compartment 47. The channels 38 and 23 duct the steam leakage overboard thru exit port 55 to either a steam collection trap for recycle or to the atmosphere. The steam turbine shaft seal 46 is retained to the seal support 27 axially by snap ring 42 and circumferentially/radially by o-rings 54. Buffer air 23 is supplied to the labyrinth steam shaft seal thru channel 39. The microturbine 10 having housing 17 retains the front bearing support 19 with the bearing 25 retained by a ring 41 and circumferentially by-rings 51. The spool rotor 20 is retained to the microturbine housing 17 thru the thrust bearing 25 and retained to the shaft via the nut 44 with the steam turbine 32 Once the steam turbine housing 33 is assembled/retained by bolts 53 to the microturbine engine body 10 with the steam turbine shaft seal 46 in place, the steam turbine 32 is axially assembled to the microturbine rotor spool 20 and retained using nut 44. Next the end cap 45 is retained to the steam turbine housing 33 using bolts 13. A high pressure steam supply source 52 is connected to the steam turbine housing port 28 and is transitioned to the steam nozzle 40 which in turn directs the high energy steam to the bladed/channeled steam turbine 32 to cause rotational power. The steam as it passes thru the steam turbine blades 41 to the turbine exhaust duct 26 is sealed via a turbine shroud 29. Exhaust steam in housing duct 26 of housing 33 exits thru steam ports 49. The exhausting steam 29 in channels 26 could be recycled or left to the atmosphere. The steam turbine housing could be two piece assembly where the 2 halves have a common parting line axial parallel to the rotor axis as a different means of design. The steam turbine rotor 32 a back-to-back radial inflow type design was selected to minimize rotor bearing 25 thrust load having the microturbine rotor spool 20 integrated. Other types of steam turbines could be contemplated but may be too complex or not practical as a cantilevered rotor. In place of an internal combustion device 11 an external heat source or combustor can be used. Also, the engine spool rotor could be incorporated into a closed Brayton cycle where the exhausting fluid 35 could cooled and returned to the compressor inlet 22. The steam turbine (rankine cycle) when combined with the gas turbine engine (Brayton cycle) uses the gas turbine exhaust heat energy to create the high energy steam to drive the steam turbine refered to as a combined cycle. Unlike the typical combined cycle systems of utility power plants with separate generators connected to the steam turbine and gas turbines, this invention with 10 steam energy to drive the steam turbine also drives a common alternator/generator rotor; but other heat sources other than the engine exhaust heat could be used to create a form of supplemental heat energy for steam or other working fluids to drive this steam type turbine.

The Microturbine 10 having one rotor spool 20 incorporates an alternator rotor 16, a compressor rotor 13 having disk and blades for working fluid flow and communicates with a combustion heat source and gas turbine rotor 12 having blades and disk attachment, all mounted in the engine body 17 having bearing 25 mounted to 19 static structure and another 14 mounted bearing to allow rotor rotation. The alternator rotor 16 with retained high energy magnets is positioned co-axially within the static alternator stator 18 and having iron base laminats with wires 15 where relative rotor rotation of spool 20 create electrical power generation through the wires 15. The Hybrid-microturbine is the same as the microturbine 10 except there is a second rotor spool in a turbocharger system incorporated to use heat energy from the exhaust 35 to drive a turbine rotor and in-tern drives compressor rotor to yield increase air supply 22 pressure to the microturbine compressor rotor for higher pressure to the compressor inlet of 13 developing higher pressure for the combustion stage yielding improved cycle efficiency. Both the microturbine and hybrid microturbine have a one spool 20 gas turbine driven alternator rotor 16 with associated compressor 13 and turbine 12 rotors; this invention integrates a steam rubine rotor 32 of the steam turbine module 50 to the same microturbine rotor spool 20 for additional energy to drive the common alternator rotor 16.

Starting the Rankine-Microturbine engine begin with rotor 20 rotation either by electrical energy to the alternator, impinging air/fluid to the compressor bladed rotor 13, the bladed turbine rotor 12 or the bladed steam rotor 32. At a defined low rpm fuel is supplied and ignited in the combustor 11 to drive the turbine to a self sustaining speed say ~50% maximum rotor design speed at which point the starter assist is removed. Depending on the power required and steam pressure energy available, maximum electric power will be generated at maximum power spool rotor rpm and maximum power turbine exhaust gas temperature. Initial power say ~25% would be available with 10 seconds at ~50% power rotor spool speed. Maximum electrical power out of the alternator rotor 16, stator 18, wires 15 is anticipate to be available within ~3 minutes from cold start conditions. As to a further discussion of the manner of usage and operation of the present invention, the same should be apparent from the above description.

Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur those skilled in the art, it is not desired to limit the invention to the exact construction and operation shown and described, and accordingly, all suitable modifications and equivalent may be resorted to, falling within the scope of the invention.

We claim:

1. A method to generate electrical output power comprising: an engine body; a combustor heat source in said engine body; a compressor rotor with blades attached, within a compressor chamber and in fluid communication with the combustor in said engine body; a turbine rotor with blades secured and in fluid communication with the combustor and attached to the said compressor rotor in said engine body; an integral alternator rotor with secured permanent magnets within said engine body, and integrated to said compressor rotor and turbine rotor as a power output rotor spool; a iron laminate stator with electrical wire is coaxially located about and in close proximity to the said alternator rotor were relative rotation cause magnetic flux and subsequent electricity to be generated; an air inlet port in fluid communication with compressor chamber; a steam turbine rotor with blades is integrated to the said power output rotor spool within the said engine body; a cantilevered steam turbine rotor as being overhung from the gas turbine rotor, a steam turbine shaft labyrinth seal, steam turbine shaft seal located in the steam turbine housing and a heat recovery steam generator (HRSG) system using the gas turbine exhaust waste heat to create steam energy for the steam turbine rotor of a combined cycle by gas turbine and steam turbine power-plant with high electrical output power efficiency, wherein said heat recovery steam generator using the gas turbine exhaust waste heat source for the steam of the combined cycle configuration to drive the said common alternator rotor for electrical power generation, the steam turbine exhaust is condensed and recycled or can be open type without condensing or recycling the steam fluid of the steam turbine system, wherein said labyrinth seal has o-ring seal of resilient material located on the outer diameter to retain said labyrinth seal circumferentially and dampen relative motion between said power output rotor and engine body.

2. A method to generate electrical output power comprising: an engine body; a combustor heat source in said engine body; a compressor chamber with an air inlet in said engine body, has fluid communication with said combustor; a compressor rotor with blades attached, is located in the said compressor chamber; a turbine rotor with blades attached and in communication with said combustor is attached to the compressor rotor and in said body; an alternator rotor with retained permanent magnets is in said engine body, and integrated to the said compressor rotor and said turbine rotor to form a electrical output power spool; an iron laminate stator with electrical wire is coaxially located about and in close proximity to the said alternator rotor were relative rotation cause magnetic flux and subsequent electricity be generated; a turbo charger system in the said engine body has a minimum of one rotor spool, having a compressor rotor with attached blades is in fluid communication with the said electrical output power spool compressor rotor inlet and the turbo charger turbine rotor with blades is in fluid communication with the said gas turbine exhaust waste heat of the said electrical output power spool, a cantilevered steam turbine rotor as being overhung from the gas turbine rotor, a steam turbine shaft labyrinth seal, steam turbine shaft seal located in the steam turbine housing a heat recovery steam generator (HRSG) system is in fluid communication with the said turbo charger turbine exhaust gas waste heat to create steam energy for the steam turbine rotor of the combined cycle gas turbine and steam turbine to cause rotation of said alternator rotor, wherein said turbo charger turbine exhaust waste heat to generate steam for the steam turbine has fluid communication with at least one other heat source including: a fossil fueled boiler, solar, geothermal, nuclear, waste fuel fired boiler, fuel cell waste heat or industrial heat process wherein said labyrinth seal has o-ring seal of resilient material located on the outer diameter to retain said labyrinth seal circumferentially and dampen relative motion between said power out put rotor and engine body.

3. A method to generate electrical output power as claimed in claim 2 wherein said steam for the said steam turbine is generated by a external heat source such as a fossil fueled boiler, solar, geothermal, nuclear, fuel cell waste heat, waste fuel fired boiler or industrial heat process.

4. A method to generate electrical output power as claimed in claim 3 wherein said external heat source to create steam to drive the steam turbine integral to the alternator rotor, compressor rotor and gas turbine rotor spool is used for initial rotational energy of the Brayton cycle as a start means of the electrical power generation combined cycle system.

5. A electrical power generation system, comprising: an engine body; a combustor provided in said engine body; a compressor chamber in said body and in fluid communication with said combustor and air inlet, a compressor rotor with blades is in said compressor chamber; a gas turbine rotor with retained blades is in fluid communication with said combustor; an alternator rotor with retained permanent magnets is integrated with the compressor rotor shaft and turbine rotor creating a electrical output power spool; an electric stator with iron laminate and electrical wire in said engine body, is positioned coaxially and in close proximity of the alternator rotor where relative motion between the rotor and stator cause magnetic flux and subsequent electricity in the wires; a steam turbine rotor within the steam turbine housing and in the said engine body is integrated to the said electrical power output rotor spool, a cantilevered steam turbine rotor as being overhung from the gas turbine rotor a steam turbine shaft labyrinth seal, steam turbine shaft seal located in the steam turbine housing is in fluid communication with the steam turbine exhaust and bearing lubrication oil; a steam turbine nozzle located in the steam turbine housing is in fluid communication with the steam source and steam turbine; a steam generation system for the steam turbine rotor is from at least one heat (storage) source: turbine exhaust gas waste heat, geothermal source, a solar source, a fossil fueled boiler, waste fired boiler, fuel cell waste heat, nuclear reactor or biomass fired boiler, wherein said labyrinth seal has o-ring seals of resilient material located on the outer diameter to retain the labyrinth seal circumferentially and dampen relative radial motion between said power output rotor spool and said engine body.

6. The electrical power generation system as claimed in claim 5 said steam turbine is a radial inflow type with back-to-back geometry.

7. The method to generate electrical output power as claimed in claim 2, wherein said turbo charger turbine exhaust waste heat to generate steam for the steam turbine has fluid communication with at least one other heat source comprising a fossil fueled boiler, solar, geothermal, nuclear, waste fuel fired boiler, fuel cell waste heat or industrial heat process.

* * * * *